US012097438B2

(12) United States Patent
Vogel

(10) Patent No.: US 12,097,438 B2
(45) Date of Patent: Sep. 24, 2024

(54) MONITORED ONLINE EXPERIENCE SYSTEMS AND METHODS

(71) Applicant: Guardiangamer, Inc., Los Gatos, CA (US)

(72) Inventor: Henderika Vogel, Los Gatos, CA (US)

(73) Assignee: GUARDIANGAMER, INC., Los Gatos, CA (US)

( * ) Notice: Subject to any disclaimer, the term of this patent is extended or adjusted under 35 U.S.C. 154(b) by 0 days.

(21) Appl. No.: 17/547,984

(22) Filed: Dec. 10, 2021

(65) Prior Publication Data

US 2022/0184502 A1     Jun. 16, 2022

Related U.S. Application Data

(60) Provisional application No. 63/124,504, filed on Dec. 11, 2020.

(51) Int. Cl.
| | | |
|---|---|---|
| A63F 13/86 | (2014.01) | |
| A63F 13/335 | (2014.01) | |
| A63F 13/49 | (2014.01) | |
| A63F 13/54 | (2014.01) | |
| A63F 13/79 | (2014.01) | |
| A63F 13/87 | (2014.01) | |

(52) U.S. Cl.
CPC ............ *A63F 13/86* (2014.09); *A63F 13/335* (2014.09); *A63F 13/49* (2014.09); *A63F 13/54* (2014.09); *A63F 13/79* (2014.09); *A63F 13/87* (2014.09); *A63F 2300/5593* (2013.01); *A63F 2300/572* (2013.01); *A63F 2300/577* (2013.01); *A63F 2300/6081* (2013.01)

(58) Field of Classification Search
None
See application file for complete search history.

(56) References Cited

U.S. PATENT DOCUMENTS

| | | | | |
|---|---|---|---|---|
| 2009/0174702 A1* | 7/2009 | Garbow | ............... | G06Q 50/265 |
| | | | | 345/419 |
| 2010/0081508 A1* | 4/2010 | Bhogal | ................... | A63F 13/75 |
| | | | | 463/40 |
| 2015/0045114 A1 | 2/2015 | Hayden et al. | | |
| 2015/0251095 A1* | 9/2015 | Perrin | ..................... | G06F 3/048 |
| | | | | 463/31 |
| 2015/0350835 A1 | 12/2015 | Kuramura et al. | | |

(Continued)

OTHER PUBLICATIONS

Saeed Wazir, Why Esports Teams Need Coaches, TheGamer Originals, https://www.thegamer.com/why-esports-teams-need-coaches/, Apr. 15, 2020.*

(Continued)

*Primary Examiner* — Jason T Yen
(74) *Attorney, Agent, or Firm* — Morgan, Lewis & Bockius LLP

(57) ABSTRACT

Example monitored online experience systems and methods are described. In one implementation, techniques initiate an online gaming experience with a first user and associate a second user with the online gaming experience. The techniques receive audio data from a game server and receive a voice overlay from the second user. During the online gaming experience, the techniques play the audio data in a speaker proximate the first person and play the voice overlay in the speaker proximate the first person.

21 Claims, 13 Drawing Sheets

(56) References Cited

U.S. PATENT DOCUMENTS

| | | | | |
|---|---|---|---|---|
| 2016/0339341 | A1* | 11/2016 | Gault | A63F 13/25 |
| 2017/0064435 | A1* | 3/2017 | Jetter | H04R 5/033 |
| 2017/0340256 | A1* | 11/2017 | Suskind | A63F 13/352 |
| 2017/0354884 | A1 | 12/2017 | Benedetto et al. | |
| 2018/0140903 | A1* | 5/2018 | Poure | A63B 23/0405 |
| 2019/0182596 | A1* | 6/2019 | Zepp | G10K 11/17857 |
| 2020/0128902 | A1* | 4/2020 | Brown | A42B 3/042 |
| 2020/0227034 | A1* | 7/2020 | Summa | G10L 15/22 |
| 2021/0081498 | A1* | 3/2021 | Goslin | G06F 18/285 |
| 2021/0370183 | A1* | 12/2021 | Dorn | A63F 13/79 |
| 2022/0032199 | A1* | 2/2022 | Rudi | A63F 13/67 |
| 2022/0134225 | A1* | 5/2022 | Omote | G06T 13/80 |
| | | | | 463/31 |
| 2023/0321548 | A1 | 10/2023 | Vogel et al. | |

OTHER PUBLICATIONS

MazezRealm, Coaches in Call of Duty Esports, Reddit, https://www.reddit.com/r/CoDCompetitive/comments/81sc3m/coaches_in_call_of_duty_esports/, Mar. 3, 2018.*

Guardiangamer, Inc., PCT/US2021/062878, International Search Report and Written Opinion, Jun. 16, 2022, 13 pgs.

Guardiangamer, Inc., PCT/US2021/062878, International Preliminary Report on Patentability, Jun. 22, 2023, 6 pgs.

* cited by examiner

MONITORED ONLINE EXPERIENCE SYSTEMS AND METHODS

RELATED APPLICATIONS

This application claims the priority benefit of U.S. Provisional Application Ser. No. 63/124,604, filed on Dec. 11, 2020, the disclosure of which is hereby incorporated by reference herein in its entirety.

TECHNICAL FIELD

The present disclosure relates to systems and methods that provide a monitored online experience, such as a monitored online gaming experience.

BACKGROUND

Online video gaming and other online experiences are played by a diverse cross-section of the population. Parents and legal guardians often monitor the games played by their children and other online activities in which their children participate. But many parents have difficulty tracking and understanding their child's online activities. Further, parents do not typically have any visibility into the online experiences of their children. As a result, many parents have difficulty connecting with or monitoring their child's online experience. Parents may also find it difficult to safeguard their children from inappropriate behavior and inappropriate communication by others online.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
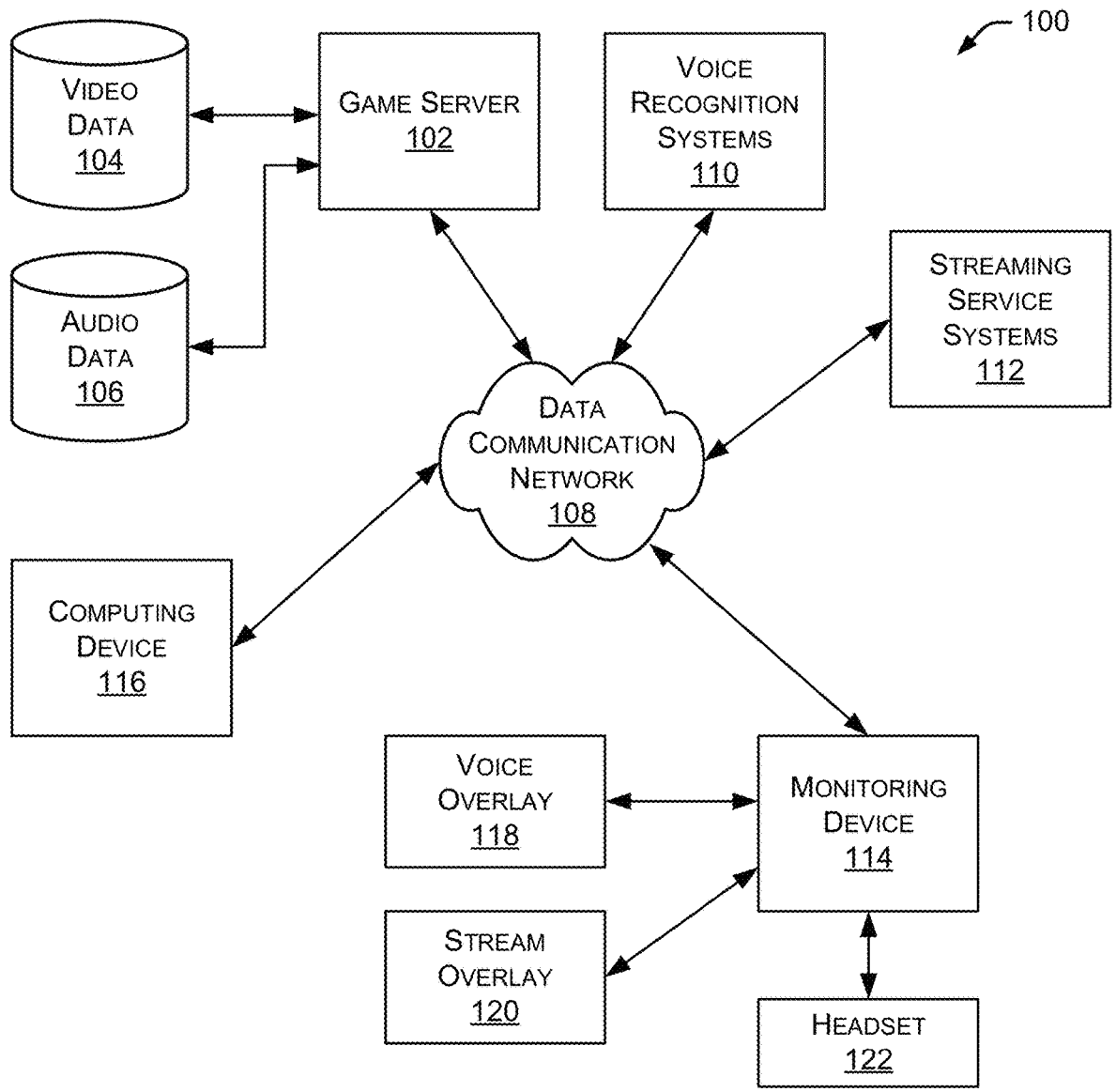
FIG. 1 is a block diagram illustrating an environment within which an example embodiment may be implemented.

In some embodiments, the systems and methods discussed herein provide guidance technology and infrastructure for creating a monitored online gaming experience for children and parents. In particular embodiments, parents or other users can monitor a child's activity as they participate in an online gaming experience or other online experience. Although particular examples discussed herein refer to a monitored online gaming experience, the described systems and methods can be used with any type of online experience and is not limited to online gaming experiences.

In the following disclosure, reference is made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other non-transitory computer-readable media for carrying or storing computer-executable instructions and/or data structures. Such non-transitory computer-readable media can be any available media that can be accessed by a general purpose or special purpose computer system. Non-transitory computer-readable media that store computer-executable instructions are computer storage media (devices). Non-transitory computer-readable media that carry computer-executable instructions are transmission media. Thus, by way of example, and not limitation, implementations of the disclosure can comprise at least two distinctly different kinds of non-transitory computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter is described in language specific to structural features and/or methodological acts, it is to be understood that the subject matter defined in the appended claims is not necessarily limited to the described features or acts described herein. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed herein may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein for purposes of illustration, and are not intended to be limiting. Embodiments of the present disclosure may be implemented in further types of devices, as would be known to persons skilled in the relevant art(s).

At least some embodiments of the disclosure are directed to computer program products comprising such logic (e.g., in the form of software) stored on any computer useable medium. Such software, when executed in one or more data processing devices, causes a device to operate as described herein.

Children access different video gaming platforms using a computer or a gaming console connected to the internet (online) or via a local area network (LAN). Online video games often have less control for parents to supervise their children's activities. In many gaming environments, children have the option to play online games while communicating with other gamers via text chat, voice chat, and/or video chat. Parents often don't know who their children are talking/communicating to on these communication channels.

Children often make new friends who are also playing the online games. However, children may have difficulty filtering "good friends" from bad people who may harm the child or their online account. Without adult supervision, a child may develop an online friendship with an inappropriate or dangerous person.

FIG. 1 is a block diagram illustrating an environment 100 within which an example embodiment may be implemented. As shown in FIG. 1, a game server 102 interacts with video data store 104 and audio data store 106. Game server 102 can execute and manage one or more games (e.g., online games) that are played by any number of players. Video data store 104 may be used by game server 102 to generate video portions of one or more games. Additionally, game server 102 may store images and other video information in video data store 104. Audio data store 106 may be used by game server 102 to generate audio portions of one or more games. Additionally, game server 102 may store sounds and other audio information in audio data store 106.

Game server 102 communicates with other devices and systems using a data communication network 108. Data communication network 108 includes any type of network topology using any communication protocol. Additionally, data communication network 108 may include a combination of two or more communication networks. In some embodiments, data communication network 108 includes a cellular communication network, the Internet, a local area network, a wide area network, or any other communication network. In environment 100, data communication network 108 allows communication between game server 102 and other components and systems as shown in FIG. 1.

One or more streaming service systems 112 stream games and other content to any number of devices and systems via data communication network 108. In some embodiments, streaming service systems 112 may stream game data, gaming information, and other content to a monitoring device 114 and a computing device 116. Additionally, a particular streaming service system 112 may stream game data and other information to a device associated with a parent of a child participating in a gaming session. In some embodiments, parents are required to provide consent for streaming game data associated to their child to other users. One or more voice recognition systems 110 may provide various voice recognition operations for the other components and systems shown in environment 100, such as game server 102, monitoring device 114, and computing device 116.

As discussed herein, monitoring device 114 may support one or more monitored online experiences, such as a monitored online gaming experiences. Additional details regarding the operation and functions of monitoring device 114 are discussed herein. As shown in FIG. 1, monitoring device 114 is coupled to a voice overlay 118, a stream overlay 120, and a headset 122. Voice overlay 118 includes data associated with one or more voice overlays (e.g., voice comments or instructions generated by a user), as discussed herein. For example, the voice overlays may include real time instructions for a child playing a game that give tips, suggestions, or other information related to the game being played, the current game situation, friends requesting to join the game, and the like. In some embodiments, the voice overlays may also include audio statements by a child, a friend, another user, a parent, and the like associated with an online gaming experience. Stream overlay 120 includes data associated with an online gaming experience (or other online experience) that may be received from streaming service systems 112 or any other system. Headset 122 includes at least one speaker for playing audio data (e.g., game data and/or voice overly data) to a participant in the online gaming experience (or other online experience).

In some embodiments, conversational scripts by a human mentor or other user may be associated with a code of conduct (or pledge) by which mentors teach and play games. In other embodiments, one or more conversational artificial intelligence systems may be used to control conversational scripts or monitor communications by mentors to confirm that the mentors are teaching and playing games according to the code of conduct.

In some embodiments, computing device 116 is operated by a user, such as a parent of a child involved in an online gaming experience. In other embodiments, computing device 116 is operated by a mentor, a coach, a monitor, a supervisor, or a guardian who is providing feedback, instructions, coaching, encouragement, or other information to the person (e.g., child) involved in the online gaming experience. As used herein, a guardian may be a verified mentor (e.g., verified by GGCertifier). In some embodiments, a mentor may be actively participating in a game with a child or other user. In other embodiments, the monitor may "follow" the child as they play the game and stream that "following video and data" to a parent of the child. Alternatively, a user (e.g., a parent) may be watching another user (e.g., their child) play a game.

In some embodiments, a monitor is the recorder of audio associated with a gaming session. The monitor may also have access to a report associated with a gaming session (e.g., a report sent to a parent of a child participating in the gaming session). For example, the monitor may analyze the report and distinguish recordings based on known voices, which may provide additional interpretations of what occurred during the gaming session. These additional interpretations can be added to the report that is sent to the parent. The additional interpretations may also generate a list of friends associated with the gaming session. If unknown friends are identified, it may lead to an inquiry by the parent asking the child to identify the friends. This information may be stored in a FriendList of the child if the parent gives consent for the interaction with the friend(s).

It will be appreciated that the embodiment of FIG. 1 is given by way of example only. Other embodiments may include fewer or additional components without departing from the scope of the disclosure. Additionally, illustrated components may be combined or included within other components without limitation.

Figure 2:
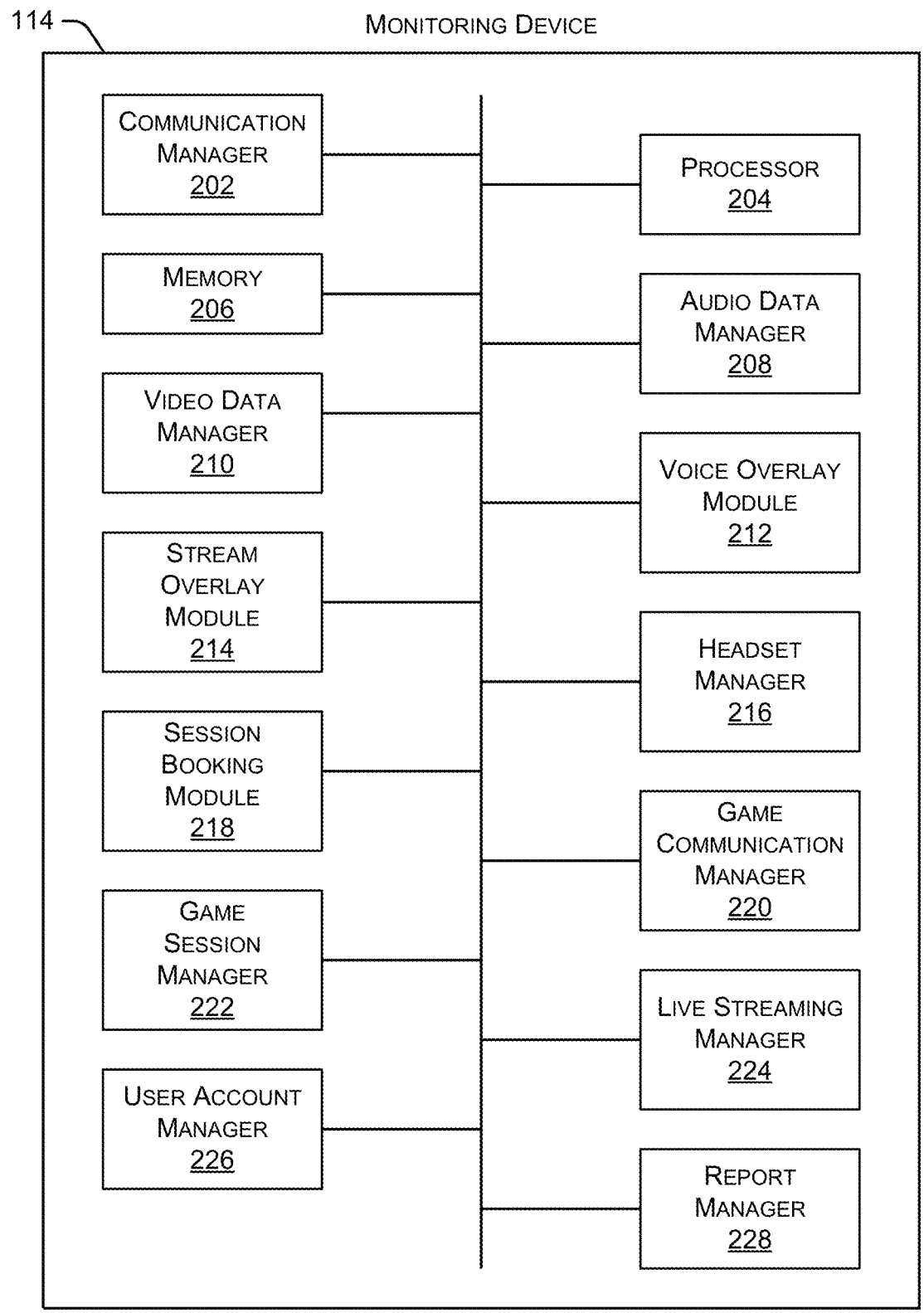
FIG. 2 is a block diagram illustrating an embodiment of a monitoring device.

FIG. 2 is a block diagram illustrating an example embodiment of monitoring device 114. As shown in FIG. 2, monitoring device 114 includes a communication manager 202, a processor 204, and a memory 206. Communication manager 202 allows monitoring device 114 to communicate with other systems and components. Processor 204 executes various instructions to perform the functionality provided by monitoring device 114, as discussed herein. Memory 206 stores these instructions as well as other data used by processor 204 and other modules and components contained in monitoring device 114.

Additionally, monitoring device 114 includes an audio data manager 208 and a video data manager 210. Audio data manager 208 manages audio data, including communicating audio data to or from other components or systems, such as a speaker in headset 122. Video data manager 210 manages video data, including communicating video data to or from other components or systems.

A voice overlay module 212 manages various voice overlay operations, as discussed herein. A stream overlay module 214 manages various stream overlay operations, such as those discussed herein. A headset manager 216 manages audio data provided to headset 122, such as audio data from a game, a voice overlay, and the like.

Additionally, monitoring device 114 includes a session booking module 218 that assists with booking online sessions (e.g., online gaming experiences) that include a participant in the online session as well as one or more other users, such as parents, mentors, coaches, monitors, supervisors, or guardians. A game communication manager 220 manages various communications associated with a game, such as communications with game server 102, computing device 116, and the like. A game session manager 222 handles the management of one or more game sessions, as discussed herein.

A live streaming manager 224 handles various functions associated with streaming services and streamed data. A user account manager 226 manages a variety of functions associated with user accounts, such as child accounts, parent accounts, mentor accounts, and the like. A report manager 228 handles various functions associated with generating, distributing, and storing reports associated with any number of online gaming experiences and other types of sessions.

Figure 3:
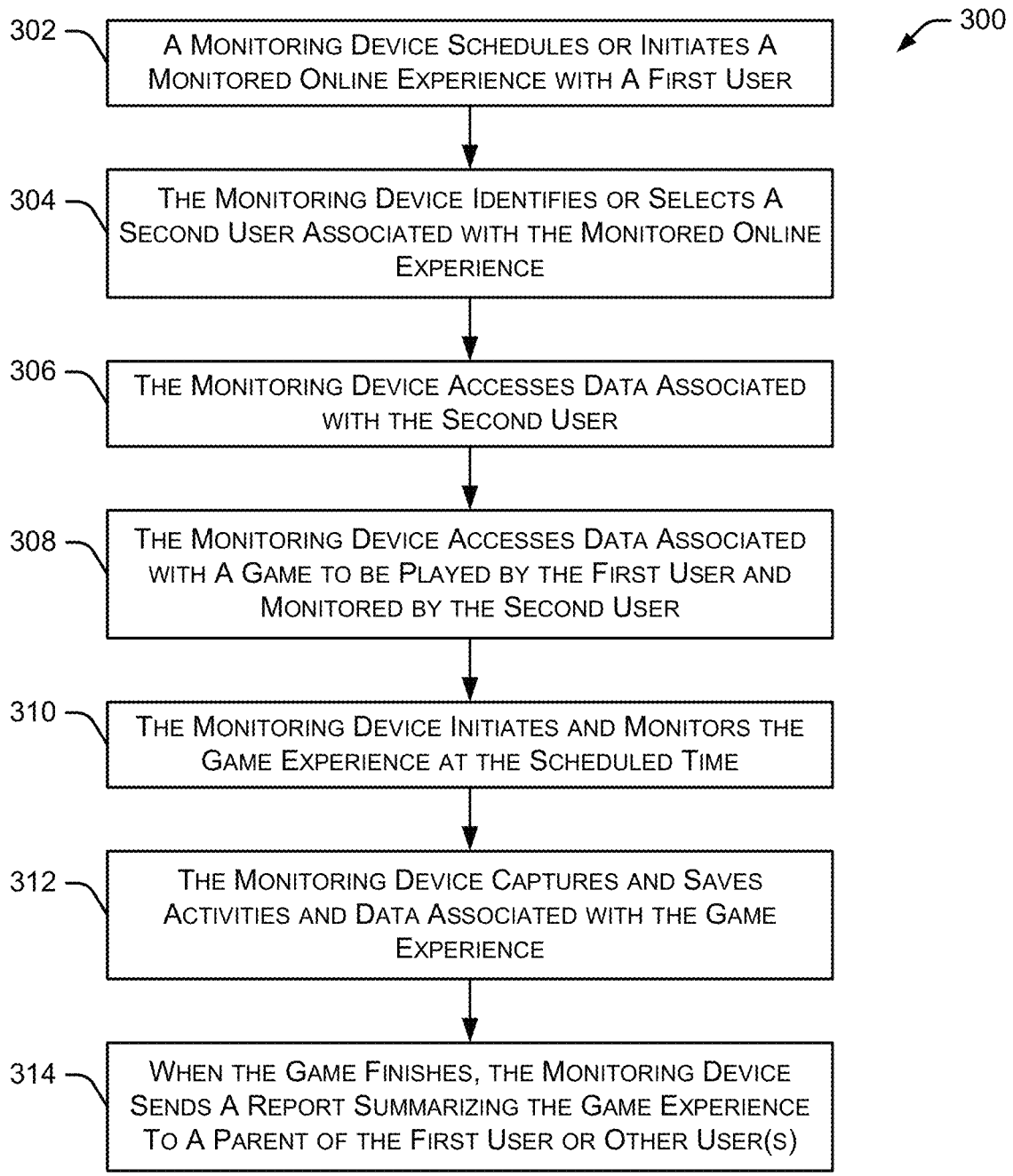
FIG. 3 is a flow diagram illustrating an embodiment of a process for monitoring an online experience.

FIG. 3 is a flow diagram illustrating an embodiment of a process 300 for monitoring an online experience. Initially, a monitoring device schedules or initiates 302 a monitored online experience with a first user. In some embodiments, the first user is a child who will be actively participating in the monitored online experience, such as a gaming experience. The monitoring device identifies or selects 304 a second user associated with the monitored online experience. In some embodiments, the second user is a parent of the first user, a mentor, a coach, a monitor, a supervisor, or a guardian. The second user may simply monitor the activities of the first user in the monitored online experience. In other situations, the second user may provide suggestions, feedback, coaching, instructions, and the like to the first user during the monitored online experience. The second user is not actively participating in the monitored online experience with the first user. Instead, the second user watches (or monitors) the activities of the first user and provides appropriate suggestions, feedback, coaching, instructions, and the like to the first user.

Process 300 continues as the monitoring device accesses 306 data associated with the second user. The data from the second user may include profile information, gaming experience, information related to previously monitored online experiences, and the like. The monitoring device then accesses 308 data associated with a game to be played by the first user and monitored by the second user.

In some embodiments, the first user may talk to the second user, other friends, other users, parents, and the like. Additionally, the first user may listen to voice statements by the second user, other friends, other users, parents, and the like. In particular implementations, any of the first user, the second user, other friends, other users, parents, and the like may communicate via text messages, chat messages, or any other messaging or communication mechanism. In some embodiments, the systems and methods described herein may prevent certain communications that violate communication policies, user profile settings, parent safety settings, and the like. For example, communication policies may prevent a child from communicating with other users who have not been approved by a parent or legal guardian. Additionally, user profile settings may restrict the type of communications (and/or the people) in which a particular child can engage.

The monitoring device continues by initiating and monitoring 310 the game experience (or other online experience) at the scheduled time. The monitoring device also captures and saves 312 activities and data associated with the game experience. In some embodiments, the monitoring device may send the activities and data associated with the game experience to another user, such as a parent of the first user or a monitor, in real time (e.g., during the live game experience). When the game finishes, the monitoring device sends 314 a report summarizing the game experience to another user, such as a parent of the first user or a monitor. In some embodiments, the report summarizes the entire game experience and allows the other user(s) to quickly learn what happened during the game experience without having to watch the entire game experience. For example, the report may include game statistics, screen shots, video clips, a narrative of the game activity, other users (e.g., friends) involved in the game, good behaviors of the child playing the game, problems with the child's game activities, and the like.

Figure 4:
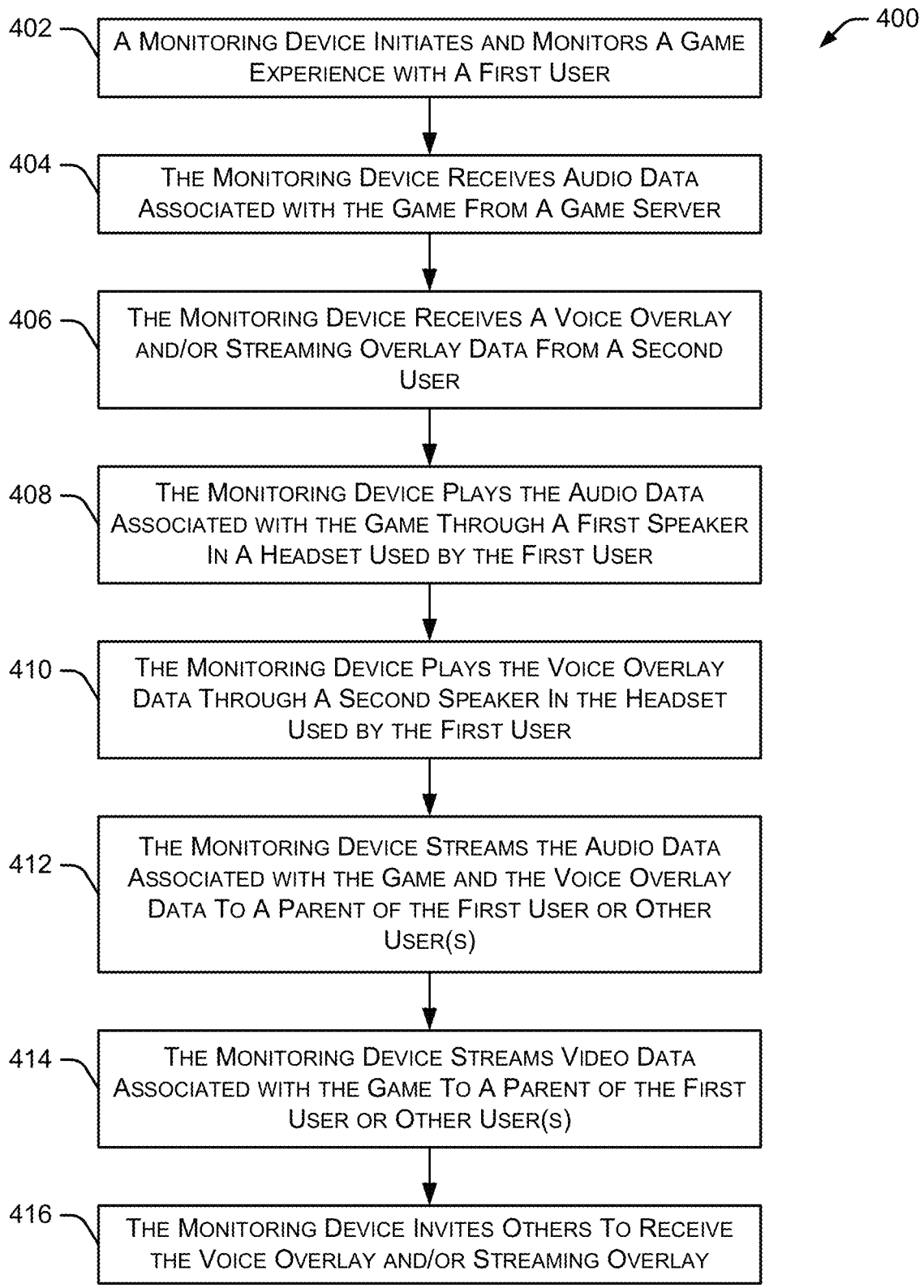
FIG. 4 is a flow diagram illustrating an embodiment of a process for monitoring an online experience with a voice overlay.

FIG. 4 is a flow diagram illustrating an embodiment of a process 400 for monitoring an online experience with a voice overlay. Initially, a monitoring device initiates and monitors 402 a game experience with a first user. The monitoring device receives 404 audio data associated with the game from a game server. Further, the monitoring device receives 406 a voice overlay and/or streaming overlay data from a second user.

Process 400 continues as the monitoring device plays 408 the audio data associated with the game through a first speaker in a headset used by the first user. The monitoring device then plays 410 the voice overlay data through a second speaker in the headset used by the first user. In particular implementations, the voice overlay data is provided in real time to the first user during the online gaming experience. In some embodiments, the audio data is heard by the first user in their left ear and the voice overlay data is heard by the first user in their right ear, or vice versa.

The monitoring device then streams 412 the audio data associated with the game and the voice overlay data to a parent of the first user or other users (e.g., coach, monitor, and the like). Further, the monitoring device streams 414 video data associated with the game to a parent of the first user or other users. The streaming 412 and 414 allows a parent or other user to observe the game session in real time. In some embodiments, the monitoring device invites 416 other users (e.g., parents) to receive the voice overlay and/or streaming overlay. In particular embodiments, voice commands may be used to create profiles, schedule a gaming session, control a gaming experience, and the like.

In some embodiments, a user (e.g., the first user or the second user) may send a link to friends or other users to join in creating information in the voice overlay. Additionally, some implementations may allow users to establish voice connections or chat connections between multiple users. For example, all players of a particular game may talk or chat with one another while playing a game. Further, a parent or monitor may talk or chat with a child while the child is active in the online gaming experience.

Figure 5:
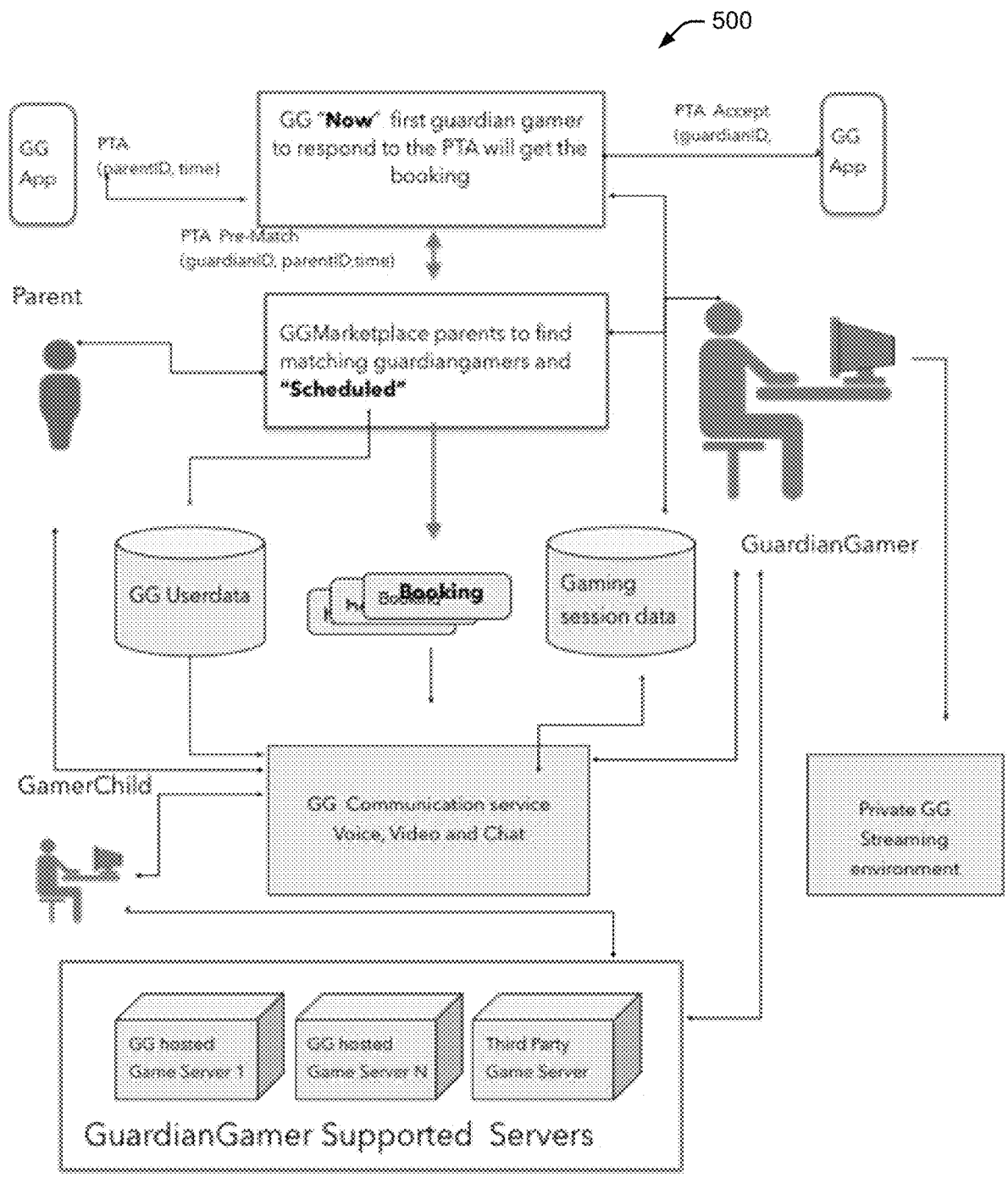
FIG. 5 illustrates an example embodiment of an environment for monitoring and guiding online gaming for a user.

FIG. 5 illustrates an example embodiment of an environment 500 for monitoring and guiding online gaming for a user. In some embodiments, at least a portion of the components shown in FIG. 5 are referred to as a "GuardianGamer System." The following list identifies terms used in FIG. 5 and discussed herein.

GGSystem—a software as a service environment for monitoring and guiding online videogaming for minors (e.g., <17 year old children)

GG—Guardiangamer, Inc. the company that operates the GGSystem

Guardiangamer—the online babysitter/mentor playing games on request of a parent

GamerChild—a gaming child

FriendChild—a friend of a gaming child

Parent—legal guardian or parent of the child on the GG System

PTA Request—play together apart request by the Parent for finding a Guardiangamer Monitored Gamingsession—a booked timeslot for Guardiangamer and a GamerChild to play an online videogame on GGSystem with the purpose to guide a child online and report events to parents Communication Channel—overlay of voice over the gaming during a Monitored Gamingsession Gaming Sessionnotes—the report and data collected during a Monitored Gamingsession Gamer Profile—an assessment of gaming behavior (represented by a vector of factors)

GG Game Server—a gaming server for GGSystem users: Guardiangamer, GamerChild or Parents.

In some embodiments, the GuardianGamer System is a capability for the Parents to match their child with an online guide (also referred to as a mentor, coach, monitor, supervisor, and the like). The guide is a human and is called a "Guardiangamer" and will guide while they play video games together apart. Adding a Guardiangamer through the GuardianGamer System (GGS) to the user experience of playing video games can improve the above-described problematic situation for young children online. Its guidance is described herein.

The Guardiangamer is online with their child and helps the parents monitor their child playing video games within a safe gaming environment during a given time. Environment 500 includes gaming servers hosted by GG or a third-party. In some embodiments, the Guardiangamer is an online human sitter taking care of a GamerChild and is being there at the online video playground: a chaperone. The guiding gamers are called Guardiangamer (Guardiangamer) and can access a variety of game servers (the online video playground). They guide the Monitored Gamesessions with a GamerChild signed up by their parents and for sessions booked and paid for in the GG Marketplace. The GG System generates, using a matching process driven by criteria defined by the parent, a list of Guardiangamers who the parent can choose to book. In some embodiments, the matching takes place on the GG Marketplace where the users are: GuardianGamers, Parents & ChildGamer.

As shown in FIG. 5, there are GuardianGamer supported servers that may be hosted by GG or a third party. On these supported servers, online friend connections between users of the GG System may be established with parent consent.

The parent and the GuardianGamer may communicate with the GGSystem via a web client or an app on a mobile device. Therefore, the invention also includes an overlay communication channel or app between the GamerChild and the GuardianGamer, with methods for Parent Control and Consent, in parallel with an online GamingSession. The communication channel may include one or more of voice, chat, video, and screenshare, which can be displayed while a GamingSession is operating. Policies related to the communication channel may be set by a parent.

In some embodiments, there are two operational modes for the GGSystem. First is "Now" (there is an instant need to connect a child with a Guardiangamer) and the second one is "Scheduled" (there is a need in the near future to connect a child with a Guardiangamer). In particular implementations, the GGSystem provides monitoring support for only the scheduled times of the Guardiangamers (in either Now or Scheduled mode).

The GGSystem provides communication support to its users as a communication overlay of any popular video gaming platform and will source these experienced gamers accordingly in both operational modes. Via a GG Marketplace, it facilitates the "Scheduled" version and offers the possibility for the Guardiangamer and the parent to turn on the "Now" mode. The GGSystem may support game servers for many popular games. Children gamers (GamerChild) are permitted to play if signed up by their parents (Parent) via the GG Marketplace. In some embodiments, the Parents are the buyers of the service provided by GuardianGamer (GG). The Guardiangamers are online workers at home, maintaining their own home workplace, their own game accounts for the gaming platforms they want to support and make themselves available via a schedule they provide to the GG Marketplace in the "Scheduled" mode. They will be able to advertise their Guardiangamer role on any gaming streaming platform in the market to get more scheduled Monitored Gamingsessions or on the Private Live Streaming Channel of GG System. In the "Now" operational mode, Parents will have access to a pool of Guardiangamers available instantly based on the stored GamerChild gameprofile.

In some embodiments, the GG System can distinguish four basic game profiles to start from: Merchant, Hunter, Pioneer, and Tacticianer. The system will start with choosing one of these four profiles for a GamerChild as the more dominant one either because at signup this has been chosen by the Parent and GamerChild or as a result of filling out a questionnaire or playing a profiling game. The GGSystem may start a gameprofile for the GamerChild (called gczero). So, a neutral GamerChild gameprofile is 25% Merchant, 25% Hunter, 25% Pioneer, 25% Tacticianer. Parent consent is needed to use the information learned or gathered on the GGSystem to adapt this neutral GamerChild gameprofile.

The Parent can make known to the GGSystem that they only want to get pre-matched with Guardiangamers who are already matched within the GGSystem in "Scheduled" mode or with any available Guardiangamer in "Now" mode suggested based the GamerChild gameprofile by the GGSystem. This is set by a GG usage policy chosen by the Parent. The Guardiangamers ready to accept bookings in Now mode will be offering the monitoring right after Guardiangamers accept a "Play Together Apart" request. The request will be sent via a mobile application and will be showing Guardiangamer profiles and reviews from the GG Marketplace, where they are also available for scheduled bookings anytime in the future. The play Now request is called a "Play Together Apart" (PTA) and it will be send to the pool of Guardiangamers available in the "Now" mode for the GamerChild, on the GG Marketplace. In some embodiments, a Guardiangamer turns on the Now mode of operation and within minutes after turning on the Now mode the Guardiangamer will be viewable in the GG app.

The Guardiangamer will use the mobile device going forward and the Guardiangamer who accepts the PTA the first will be sent a communication link by email like with an accepted booking and a link will show up in the GG app.

Once the link has been clicked on by the Guardiangamer he or she is online with the GamerChild of the Parent who requested the PTA. The Parent will be charged for the service and the Guardiangamer will leave notes in the Now app after the completed booking time. After completing the booking, the GuardianGamer will get paid for the price they have advertised on the GG Marketplace. In Now mode, this will result in a booking at the current time of the PTA Request. It assumes the Guardiangamer has a free schedule in his calendar for the time of the booking. When Now mode is activated this has been guaranteed, and the GGSystem is able to add bookings to the schedule of the Guardiangamer on acceptance. The GGSystem provides the monitoring support like in scheduled mode. This might require the Guardiangamer to have access to a gaming console or other gaming client connected with the online video gaming platforms.

Parents will review the Guardiangamer after the booking by giving them p-stars. These star reviews can also be used in the GG Marketplace as a selection criteria. The star reviews tell the GG System how well the Guardiangamer completed the assessment. A GamerChild can, during the Monitored GamingSession, give the GuardianGamer gc-stars, which tell the GGSystem the child liked the gameplay. These gc-stars add up to the gamerprofile of the GamerChild using various formulas.

In some implementations, the onboarding process of the Guardiangamers on the GGSystem, or the qualification process for a Guardiangamer, includes: Gaming profile assessment of the Guardiangamer (ggnzero), ID verification, background checks, online presence checks, online training, and the like. GG Certifiers will assess whether a Guardiangamer is allowed to use the GG Marketplace. These steps are performed to assure the parent that the GGSystem knows the providers and the parents can trust the GGSystem and trust the Guardiangamers with their children.

Figure 6:
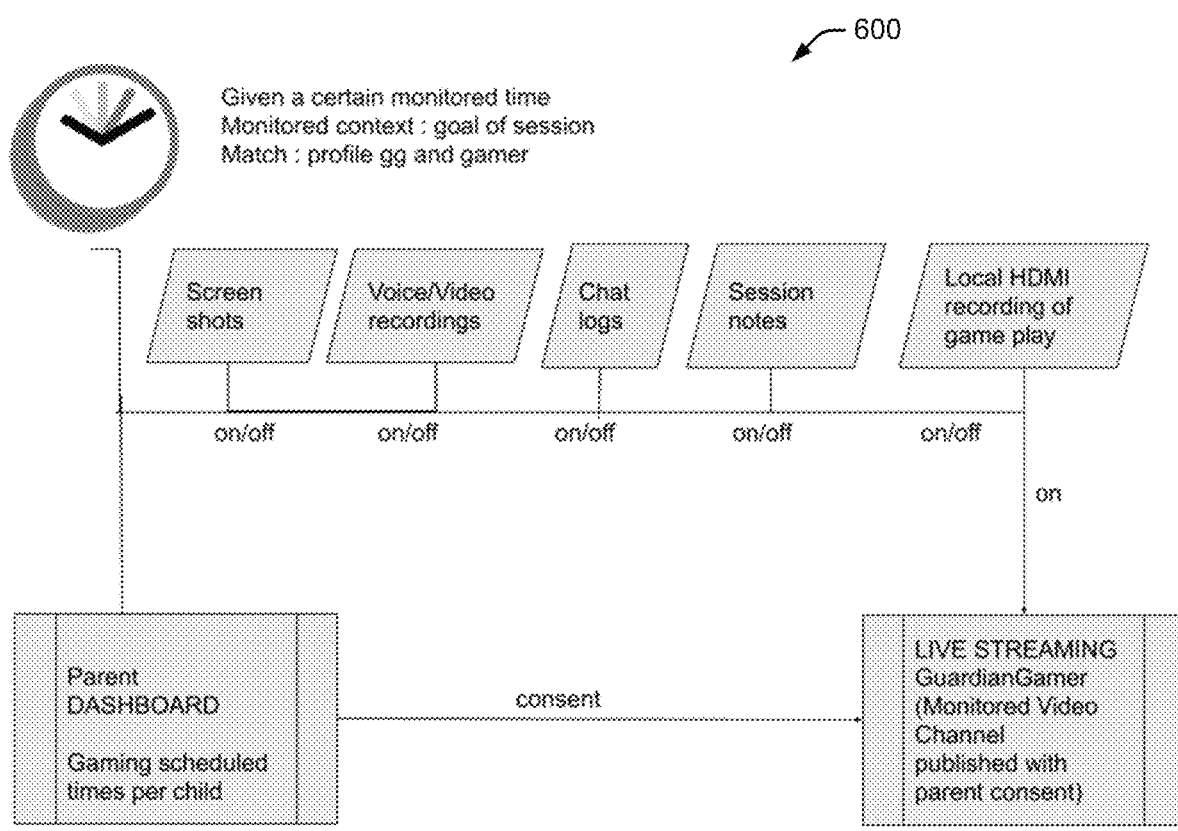
FIG. 6 illustrates an example embodiment of settings and information associated with a monitoring session.

FIG. 6 illustrates an example embodiment 600 of settings and information associated with a monitoring session. When a GamerChild is new to the GGSystem, the system may use various parent driven-criteria and everything the GGSystem knows about the child (e.g., what the parent provides about the child). In some embodiments, the system may learn more about the child via the online interactions and conversations with Guardiangamers, as well as information released during the matching process. The matching algorithm can learn over time and can predict matches better if more information sources are used (with parent consent). The information in the GamerChild userprofile may be used in the matching process, but is private to the GG system and accessible by the parent for review through a GG Parent Dashboard.

In some embodiments, parents can turn on or turn off every bit of information gathered by the Guardiangamers to determine whether that information will be added to the gameprofile. After using the GGSystem, the monitored video gaming sessions will generate new information via Gaming Sessionnotes written by the Guardiangamers for the Parent: video guide-play screen dumps, chat logs, and voice recordings (e.g., Gaming session data). Information about the child can be stored in the system or can be deleted from the system by the parent. If the parent gives their consent to use the information, the GGSystem will assess the information again and, based on this assessment, the GamerChild game profile may be changed. The parent can control the information in the userprofile and will choose what is available for (e.g., what information can be public and what should stay private to the system). Public information can be used to train other Guardiangamers on the GG System and/or teach other Parents and GamerChilds on the GG System about good or bad gaming behaviors. The private assessments are presented on the Parent Dashboard. The system uses the information of the GamerChild if it has consent of the user profile owner. In GGSystem this is typically the parent.

During a GG Monitored video gaming session, a Guardiangamer makes notes which can be stored in the GGSystem and can be accessible for any Guardiangamer scheduled by the parent if the parent wants them to see them during a Monitored Gamingsession.

The GGSystem provides a Communication Channel via a GG communication system. This may be based on webRTC (web real-time communications) technology. The communication system provides a voice, chat and video communication environment, and maintains the channels for the GG Users. During a Monitored Gamingsession there is an exclusive GG Communication Channel available on the GG communication system for the GuardianGamer and GamerChild to interact in a conversation via voice and chat with or without video. A Parent can also participate in the conversation. The Guardiangamer may be asked by the GamerChild to add a FriendChild to this GG Communication Channel. In some embodiments, the Guardiangamer may add the FriendChild if the FriendChild is a registered user who was registered by the Parent of that FriendChild on the GGSystem. Once the FriendChild has a GG username and is existing on the GGSystem, the Guardiangamer is able to add the Friendchild to the same Communication channel as a GamerChild. The FriendChild will be sent a valid invite to the conversation by the Guardiangamer for the duration of the Monitored Gamingsession.

The parents of the GamerChild may be informed and asked for their consent for the FriendChild to participate in the conversation online via the same Communication Channel. So, they also know who their child is communicating with. The Parent will be able to approve this automatically via a defined friend policy. The Parent may be able to block an added FriendChild. The described systems and methods provide a positive approach towards being transparent about whom the children have social interactions with on the Friendslist, which may be maintained in the GGSystem. Instead of forbidding them to communicate with friends, the systems and methods register the conversations and optionally records them based on friend policies involved. The GuardianGamer operates as a secondary approver of the FriendChild's access to the friendslist of the GamerChild.

Together with the GamerChild, the GuardianGamer assesses the friendship and decides to send the invite or not. If the FriendChild is not on the GGSystem the children will not be able to communicate by default right away within the Monitored Gamingsession. This situation may be mentioned on the Gaming Sessionnotes by the GuardianGamer. This will result in a note mentioning a missed friend. However, the GuardianGamer may send an invite for signing up the FriendChild via the parent contact info provided by the new Friendchild on the GGSystem, which then during the Monitored Gamingsession will show that there is an invite for their child. Once the parent contact signs up, the inviter will be on the Friendlist. If they do not sign up during the session, they still have time to do so, and next time the GamerChild and the FriendChild will be able to join on one of the GG Supported Servers. The new Parents can also book their own GuardianGamer for their GamerChild in which they then can invite the friend again also to join the conversation. This inviting each other makes it possible to share a Monitored Gamingsession, however the associated GuardianGamer will only report Gaming Sessionsnotes back to the booker.

GuardianGamer will inform the Parent that the FriendChild wants to participate in the online conversation with one of the GamerChildren. When they are new to the system, they will get information on how their child can join GuardianGamer and how they themselves can book or manage Monitored GuardianGamer sessions. It will keep track of the social interactions a signed up GamerChild has. The parent will have access to social interaction information via a Parent GameDashboard feature. This dashboard organizes, visualizes, and informs the Parent about the activity on the GG Supported Servers and GG Communication System.

The GGSystem also allows the parents to listen in on the Monitored Gaming sessions. In some embodiments, the group of children allowed in the conversation is small (e.g., a maximum of five) and only for the time the Monitored Gamingsession is active and only for GGusers.

The Monitored Gamingsession has a defined gaming goal associated consisting of a combination of the factors used in the gameprofiles, for example (% Hunter, % Merchant, % Pioneer, % Tactitioner) were used in an earlier example. The gaming goals are pre-defined in the GGSystem or generated by the GGSystem. So, Gaming goals have a GoalProfile similar to the GamingProfile of the Guardiangamer and the GamerChild. They have a weight for every factor. Examples include: just mindless gaming (0,0,1,0), building something (0.5,0.5,0,0), winning something (1,0,0,0), making a friend online (0,1,0,0), finding a safe gaming server (0.5,0,0.5,0), finding an existing friend (0,0.5,0.5,0), gaming together without spending money (0.25,0,0.75,0), developing a life skill (0.25,25,0.50,0), shooting others (0,0,0,1), being kind to other players (0,0.75,0.25,0), and the like. These PrimaryGoals are chosen by the Parent to strive for and will add to the GamingProfile of the GamerChild profile given the above weights. Guardiangamer will enhance the already existing interests of a child with appropriate gameplay for a given goal using a formula GCProfileGoal, similar as GCProfiler, but then replace the GG profile with a goalprofile, and eventually this will result in a new GamerChild game profile after completion of the GG Monitored session. The GuardianGamer can give the GamerChild gg-stars. These may be used in the GCProfileGoal function to change the Game profile of the GamerChild.

Another situation would be an entrepreneur goal. For example, some children are very social and will make a lot of friends online because they create and win for themselves money by selling in-game assets to online friends and their friends the in-game assets. If the Gaming Sessionnotes show that all the e-goals are met, the GoalProfile will be a composition of a weights averaged over all primary goals met. When goals like that are met, an extra factor (initial value is dependent on the parent review and child review, all the points will go to the new factor) may be added to their Gamer Profile. Thus, children could become entrepreneurs later in real life where they attract a lot of buyers for a product if, in the online world, this behavior has been practiced. So, they may also score high on the GGSystem for becoming an "entrepreneur".

The GuardianGamer System may enlarge these examples and will show parents that there is a lot of positive brain development in that area has been gained with video gameplay. Another example of a GoalProfile that is a composition of overall primary gameplay that the GamerChild chooses to play on a supported GG Game Server where all users talk about for example "Climate Change" and on the GG Game Server users build this world. All actions in the Monitored Gaming Session contribute to a score on a being "climate change aware" or "earth-safer", and can lead to adding that factor to the Gamer Profile. After composition of GoalProfiles are met in that Monitored Gaming Session and on that Game Server, the corresponding factors ("entrepreneur"=e and or "climate change aware human being"=c) will be added to the GamerProfile (h,m,p,t,e,c), where the total of factors is equal to 1. Some users do not have a score for composition goals, so e and c in the above example are 0 for everyone else who have not scored on these factors.

These examples may be highlighted on a live GG Streaming Channel with consent of the involved parent to show to other parents. Also, these examples can be watched by other GuardianGamer users (e.g., targeted to parents) on the private GG Streaming Channels. And these examples may be highlighted by the GG System to model good behavior.

The GG System described herein shows how a GuardianGamer may become the bridge between the Parents and Children, and eventually their Monitored interactions online between the three of them may lead to a better understanding of what is going on in the child's online life. The parents can become a participant instead of a spectator and gain insight in all the Gaming goals met online.

The GG Sessionnotes can be input for a video sharing/streaming channel. The parents and the Guardiangamer give their consent the GG System to show these notes in a gaming positive way on the video sharing/streaming channel of GG. The GG system will publish them on a streaming channel in real time via the GG system, so parents can tune in to all Guardiangamer sessions published on the private streaming channel. The Guardiangamer makes available to the GGSystem's channel the gaming session video from its local workplace during the monitored time. The Guardiangamer is allowed to use the stream publicly if the Parent has given their permission on the ParentDashboard.

The Guardiangamer is a human, verified and certified by the GuardianGamer system and allowed to game with a GamerChild. The Parent may consent to publish on the video sharing/streaming platforms or not. For the Guardiangamer, it is an honor to be selected by the Parent. He or she will comply with the chosen policies of the Parent and GamerChild. Values and behaviors of the Guardiangamer may be assessed by the Guardiangamer certifiers regularly. The Guardiangamer will be able to advertise for GGSystem using the Monitored gaming session streams on public gaming channels the GGSystem allows (real time or recorded) and only the streams permitted by the Parent.

The GGsystem may keep track of reviews of the Guardiangamers by the Parents and there may be other ways for the Guardiangamer to gain a better overall assessment in the GGSystem. The better the assessment, the higher the GGSystem may rank the Guardiangamer in the matching algorithm regardless of hourly rate.

In some embodiments, GG verifies the identity of the Guardiangamer, completes a background check and an onboarding interview, along with an organized training. The Guardiangamer may be a trained positive gaming coach for the GamerChild and can assist the child online with navigating the online gaming platforms the GGSystem allows.

Parents first sign up for the GuardianGamer System and create a profile account for their GamerChild with Parent consent. This may include an email address where the GamerChild will be reached. Also, GC Gamerprofile (gc-zero) can be created by answering questions, playing a game or just selecting a given gamer profile. As discussed herein, there may be four basic profiles to begin with. This gamerprofile is stored and used by the GGSystem for setting up communication channels with Guardiangamers and generating lists of Guardiangamers to select from. The GG System will use search criteria given by the Parent to suggest matching Guardiangamer based on their gamerprofiles.

The GuardianGamer will stay with the child in the online worlds during a specific time scheduled (e.g., a session). During the scheduled time, the GuardianGamer will monitor the child. In some embodiments, the GGSystem provides Game Servers for all available games. For the child, the gaming experience should be as fun as before with only the difference of having an extra player in their party for a few moments in the day. The Guardiangamer may become one of the child's online friends for that monitored time of the gaming session. His or her experience will be mostly playing a video game they want to, and the Guardiangamer will get tagged along.

The Guardiangamer and the GamerChild will communicate via a monitored communication/voice/video channel specifically set up for them by the GuardianGamer System. The Parent may access the same communication channels and can listen in and/or playback the Monitored gamingsessions. Also, the gamingsessions can be streamed to the streaming channels. So, the platform enables the parents to tune into the video gaming session between the Guardiangamer and their ChildGamer during the monitored session and after the session has finished. During a Monitored gaming session, the Guardiangamer can make notes and will report back in a standardized form. This note reporting tool is one way to know more about the online behaviors of their children.

Parents do not have the knowledge to use all the video gaming platforms and do not need to create accounts on the variety of gaming platforms in the market to see their child play. The GGSystem does this via a Guardiangamer, so they are able to see what is going on. So, they do not need to manage a gaming account for themselves.

Each booking results in a monitored gaming session, where the guardiangamer is assessing where the child plays games and what is happening in the booked timeslot. The stage during the session is set for modeling positive behaviors on one of the GuardianGamer Game Servers. The child will be coached on how to spend game money, how to find a friend, what/how to build, what to do with negative behavior or interactions, who to talk to, and the like. Each person a child wants to talk to needs to register as a guardiangamer user. And, the parents give their consent to communicate with their child. The GGServer will not allow non-GG users to access the GG Game Servers.

The guardiangamer user is signed up by a person 18 years or older and is either the legal guardian, parent of a gaming child, or a guardiangamer who has gone through a selection and training process and eventually onboarded. In some embodiments, the onboarding process may include:
  Preselection using 10 or more questions
  A 30 min interview with a GGcertifier (or as long as it takes)
  Training video and test
  Three or more hours of training gamingsessions, of which one hour may be watching other sessions on the platform live. Feedback from guardiangamers, parents, and children may result in onboarding or not.

Preparing a Listing for Accepting Bookings

The user registration and booking of gamingsessions may be performed on the GG marketplace (GGMP). A booking confirmation and delivered GG gamingsession notes will give the guardian a compensation for their guidance effort via an hourly set rate in their listings. The guardiangamer will have created a listing on the marketplace. The hourly rate is a fair rate and it reflects the guidance time and effort a parent can expect.

In some embodiments, the described systems and methods may count the monitored minutes per game on the GG Game servers and measure general gaming statistics. The games in the system supported by guardiangamers will grow over time, but starts with the top games played by children. Within the GG Game Servers, the systems and methods may give safety certificates to the games.

In some embodiments, the systems and methods described herein may provide safety features to protect the users (especially children) of the GGSystem. For example, the systems and methods may do one or more of the following.

Count and evaluate review points by parents on Monitored Sessions.

Count the number of positive words in conversations in Monitored Sessions.

Delete bad words (profanity, aggressive words, judgmental words, sexually explicit words, and other age-inappropriate words).

Controlling streaming sessions through protected servers.

Positive reviews for specific streaming channels.

Adding children to the system with parent involvement.

Tracking missed FriendChilds.

Tracking usage per GamerChild.

The described systems and methods may analyze one or more of the above factors to determine the safety of a particular game, particular players, and the like.

In some embodiments, the systems and methods described herein may determine appropriate ages for particular game streaming channels. For example, the GGSystem can show live gamingsessions streamed with the enthusiasm of an audience (e.g., parents and children and other guardiangamers) voting for the guardiangamer, so eventually it ranks higher. In some implementations, only GG users can vote and give badges (e-rewards) for accomplishment in gaming and in mentoring the youth they see. The streaming content can be rated by the GG Users, which can be a measure for non-GG Parents to allow their children to watch it.

In some embodiments, GG implements personal gaming intelligence using artificial intelligence, which can be offered to the Game Platforms as a way to take care of its users. For example, GG may analyze gameplay conversations and store the general and personal gaming context with consent of the parent to create awareness of what impact the gaming has on the developing child. GG can model various aspects of the unstructured gaming conversations between the Guardiangamer and the GamerChild, and by doing so the systems and methods can develop an adaptive GG AI component. This may start with recognizing positive and negative words and possibly deleting out bad words within Monitored Gaming Sessions, recognizing intent by combining written Gaming Sessionnotes (with game-goal) and recordings (voice and/or video). Once the model is trained with significant data, GG can maintain: a GG Gaming Intelligence model and training data (GG will provide unbiased data from its GGSystem). This approach may reduce biases within games by analyzing the game-specific data (the intervened sessions) and implementing a feedback loop (e.g., the GGProfiler based on 5-star review).

The generic maintained Gaming Intelligence model of the overall activity on the GGSystem will lead to suggestions for adaptations for GamerChild online experiences, and in cooperation with the Parents these suggestions may lead to actionable steps to take to improve the online experiences of the GamerChild.

The GG AI as an add on to the GGSystem (with the purpose of monitoring for child safety) is possible because the GGSystem overall is heavily invested in the guidance of children by humans. The described systems and methods can document the kind of contextual sensitive data people are looking for in modeling gaming behaviors and translate it into a neural network of good behavior of the developing child brain. Classical rule-based AI techniques and supervised deep learning (neural network) together may indicate whether or not a parent needs to intervene or become part of the conversation online. Thus, the GGSystem may suggest actionable positive guidelines for parents and their children.

The conversation data during game play and the session-notes (e.g., goal, goal profile, definition and description of successfully reaching the goal) together form the context of a conversation about what is happening online at a specific moment, and can sometimes guide the offline conversation between a parent and their gamerchild later. The video, voice, and logged text chat between the Guardiangamer and the GamerChild will feed into a GG defined (e.g., rule based) or trained personal AI model. If the parent has been involved as a participant of the online conversations, the AI model will also be able to reflect this. So, the AI model may know that a parent is involved and gives consent to use the information for the AI modeling.

In some embodiments, the GuardianGamer System can make predictions over time to define the GamerChild's game personality development within a particular video game, or in the overall GGSystem in general. This information may give Parents guidelines and insights regarding how this might relate to the offline personality and behaviors of a child. An intervening measure could be reducing the amount of time kids spend playing online games in general (including outside monitored hours). The information may also help a parent or child visualize the amount of money they will spend, earn, or save within a particular game based on a certain Gamer Profile. For example, the AI model could make predictions on future paths towards successful professional developments.

Once the AI model is developed specifically for a unique child, the AI model can be used in the non-monitored gaming moments (e.g., without a Guardiangamer as a human) as an AI-agent or a bot within a third party gaming environment connecting to the GGSystem backend for keeping up with the GGProfiler. GG could develop a continuous service for monitoring playtime, which may help the Game developer to trace new behaviors to be modeled for a particular GamerChild. A game could demand a GamerChild to use the GGSystem consistently for a certain time with a human Guardiangamer to establish her or his AI model to be used and adapted going forward. The game developer, once the more advanced gamerprofile (like the one who identifies an entrepreneur or an architect) is known, can then use this AI model to motivate a GamerChild to play responsibly and adapt to it in the flow of a game.

In video games on non-Guardiangamer servers, the described systems and methods can make these agents available and/or they can program bot accounts that shadow plays with their child online, such as continuously playing video games and helping the child to stay safe online. The systems and methods may also offer this AI capability to the gaming platforms in a non-biased way (e.g., in a maintained positive behavior model which will alert odd things are happening and, over time, self-calibrate towards new actual behavior where guardiangamers can be trained to prevent in the future, also called the GG feedback loop). This approach may be considered a more advanced way of monitoring on top of existing in-game monitoring techniques and it may allow the GG system to build in-game components. Instead of hosting gaming servers as safe playgrounds with a safe group of friends (e.g., known by the parents) it can self-calibrate and, together with a feedback loop into the GG System, games can become GG Supported and safer. In some embodiments, the AI model is trained in a positively controlled gaming environment and may need modifications once there are no human Guardiangamers involved. Alternatively, the role of Guardiangamers may become the role of generic moderators in the games supported with positive gaming AI agents.

Figure 7:
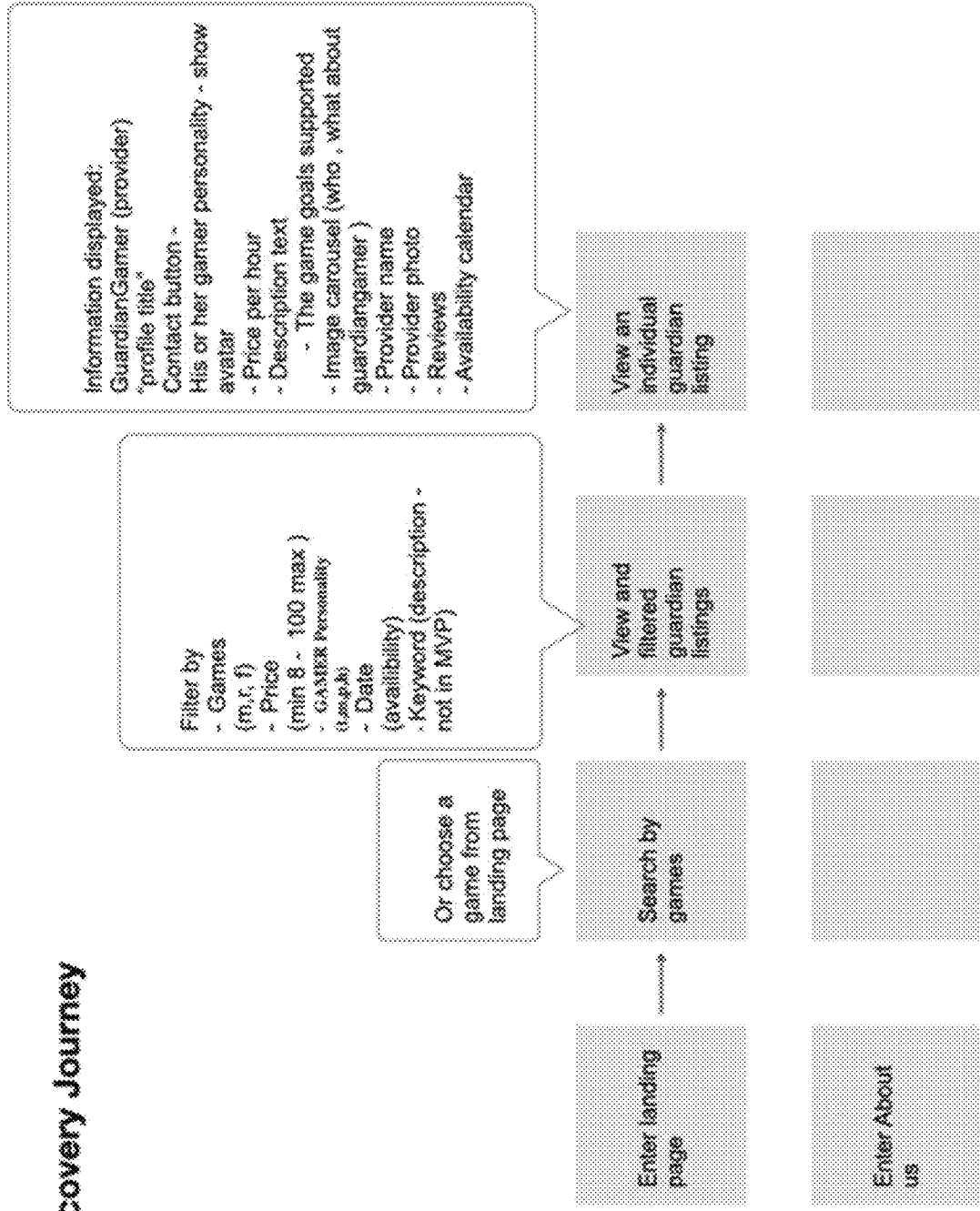
FIG. 7 illustrates an example process for discovering guardian listings.

FIG. 7 illustrates an example process for discovering guardian listings. As discussed herein, parents or other users may search for a Guardiangamer to monitor and engage with their child or other person.

Figure 8:
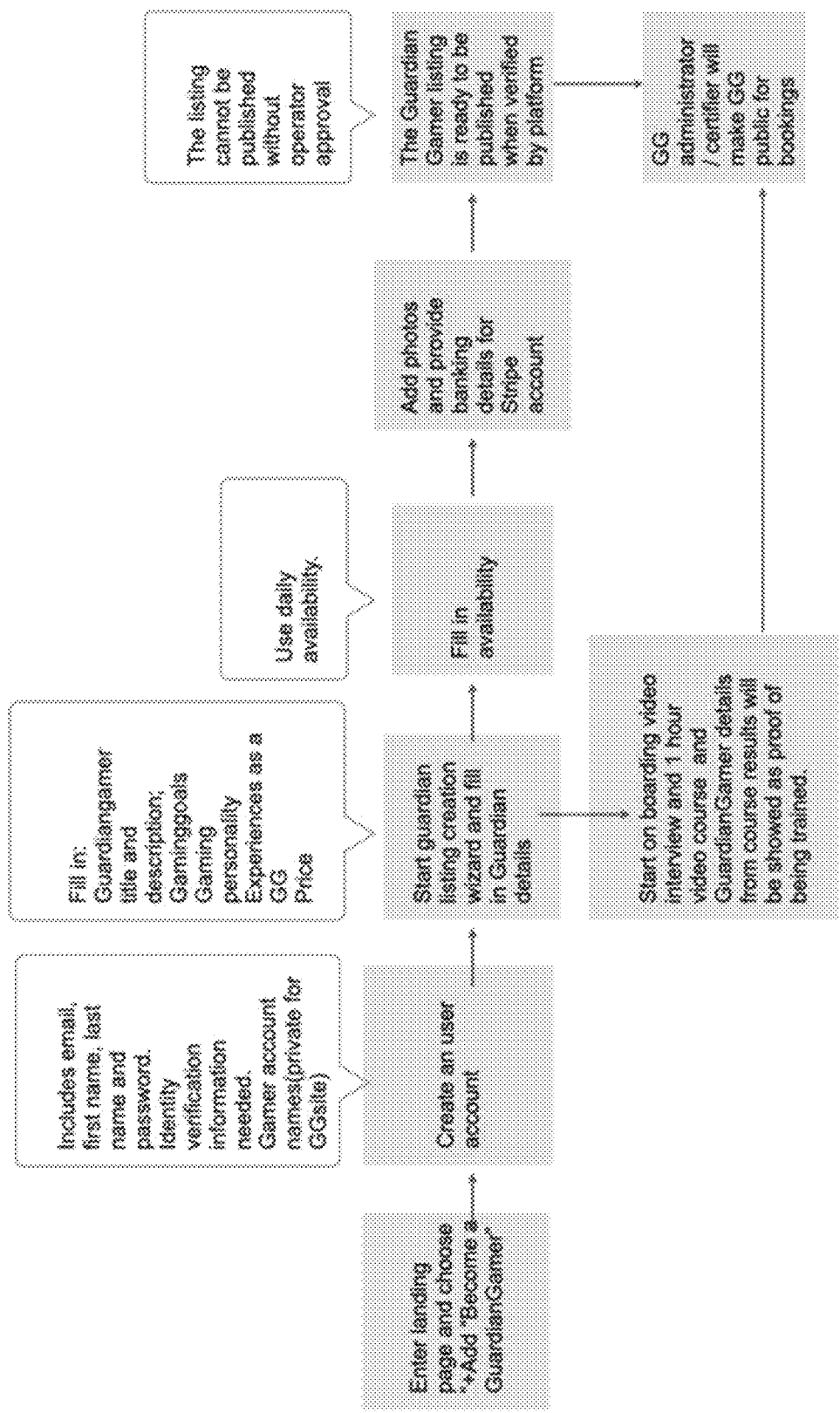
FIG. 8 illustrates an example process for creating a guardian profile.

FIG. 8 illustrates an example process for creating a guardian profile. As shown in FIG. 8, a user may create a user account, initiate creation of a guardian listing, identify their availability for gaming sessions, provide banking information, and publish their listing. After completing this process, parents and other users can find the Guardiangamer and hire them for a particular gaming session.

Figure 9:
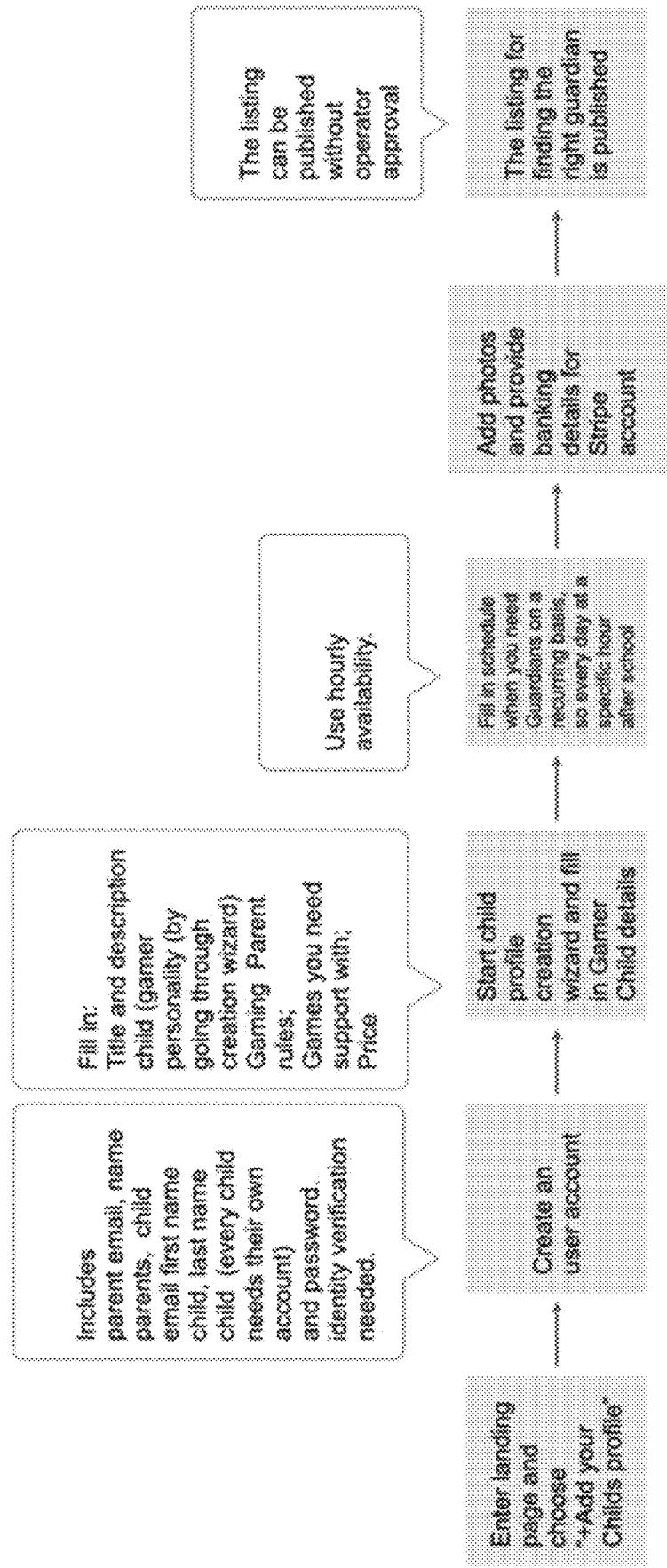
FIG. 9 illustrates an example process for creating a parent or family profile.

FIG. 9 illustrates an example process for creating a parent or family profile. The example of FIG. 9 shows a process that includes creating a user account, creating a child profile, identifying times when a Guardiangamer is needed for a session with the child, providing banking information, and creating a listing for finding a Guardiangamer.

Figure 10:
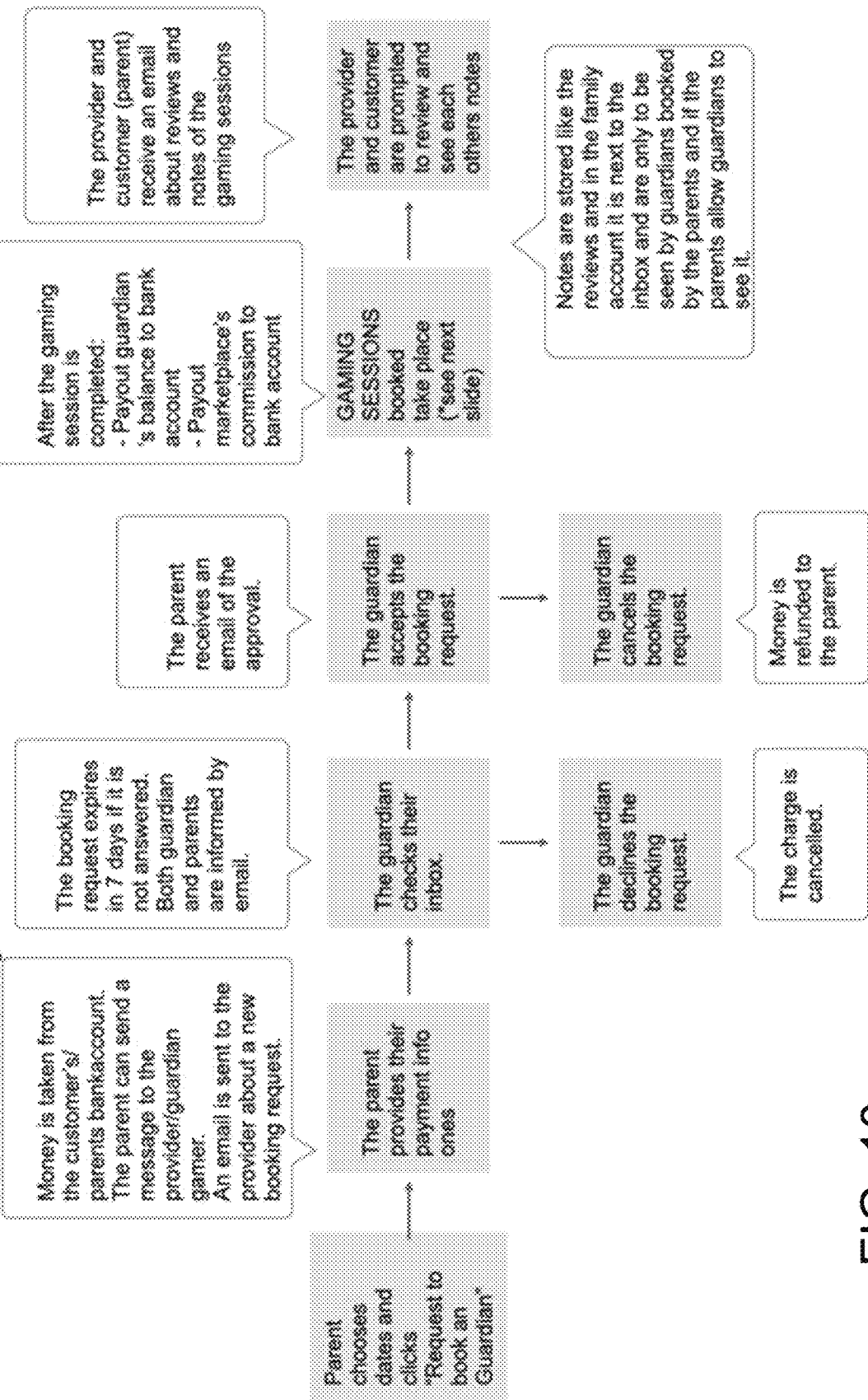
FIG. 10 illustrates an example process for scheduling a guardian for a gaming session.

FIG. 10 illustrates an example process for scheduling a guardian for a gaming session. This example process includes a parent generating a request to book a Guardiangamer and providing payment information. The Guardiangamer may accept or decline the booking request. If accepted, the gaming session(s) are booked an the gaming sessions take place. After each gaming session, the Guardiangamer will provide notes related to the gaming session.

Figure 11:
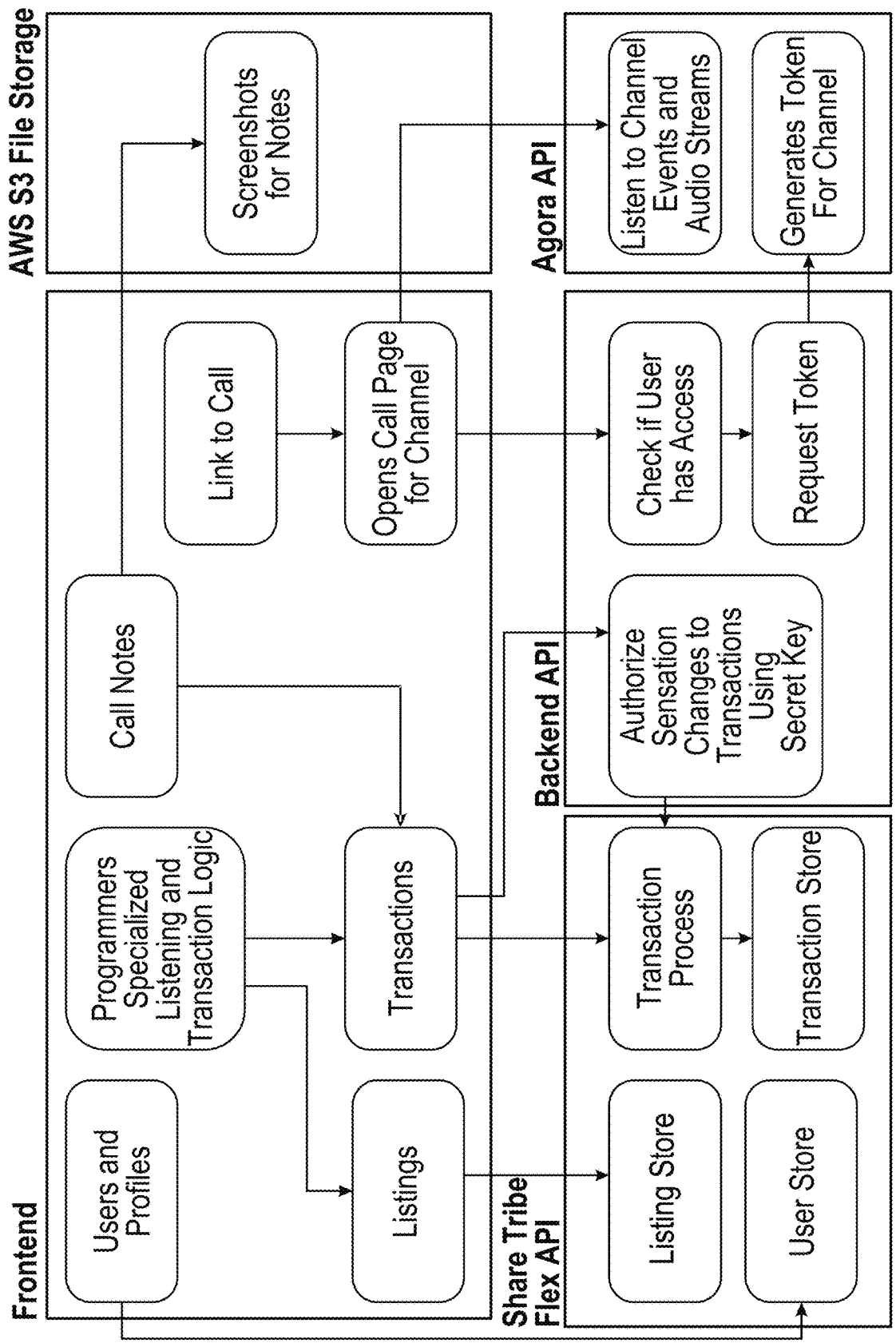
FIG. 11 illustrates an example architecture within which an example embodiment may be implemented.

FIG. 11 illustrates an example architecture within which an example embodiment may be implemented. As shown in FIG. 11, the example architecture includes a frontend, AWS S3 file storage, a Sharetribe Flex API, a backend APT, and an Agora API. Various data, activities, and other information are shown in the different components of the example architecture.

Figure 12:
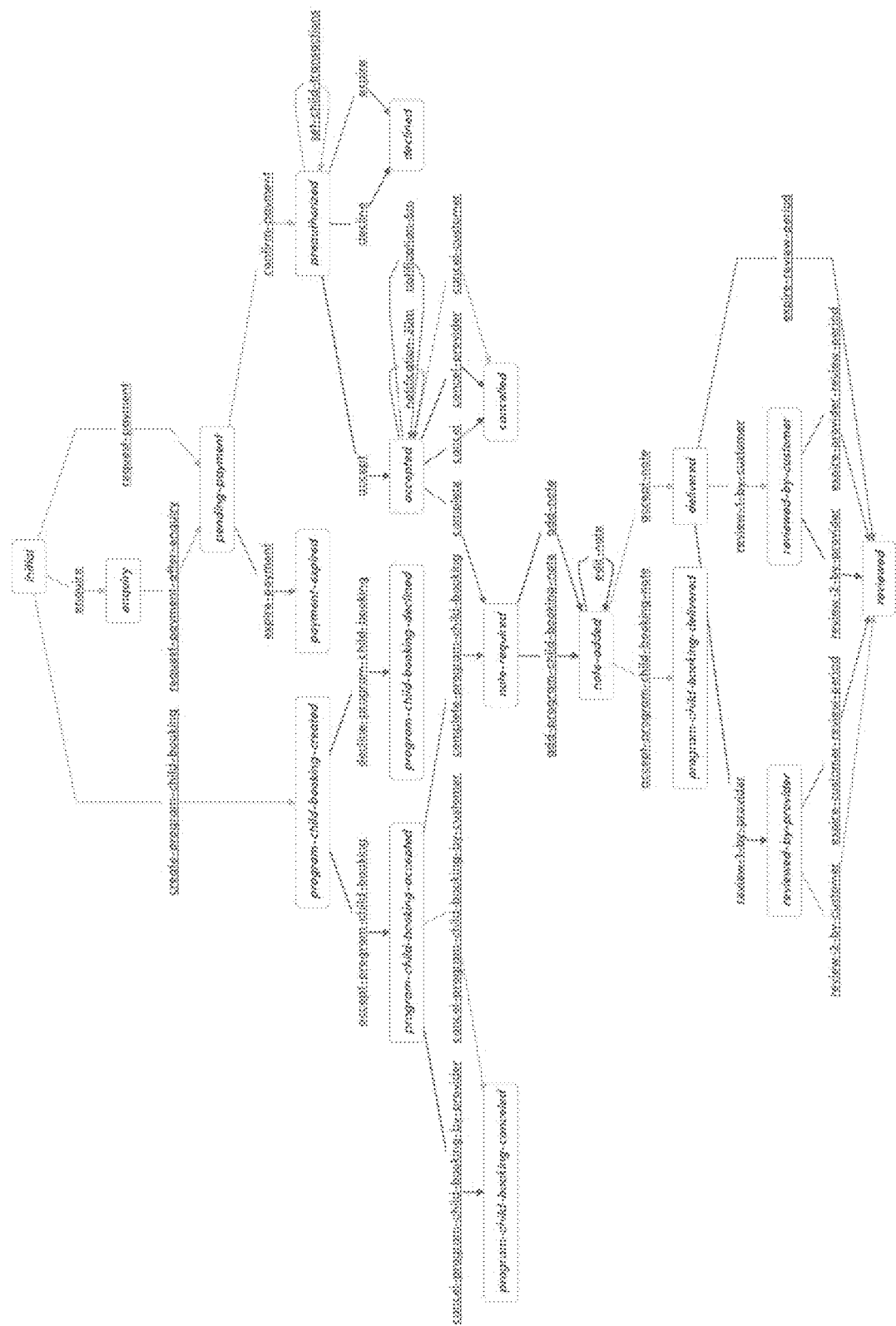
FIG. 12 illustrates an example transactional process diagram.

FIG. 12 illustrates an example transactional process diagram. In some embodiments, FIG. 12 represents a transactional process associated with scheduling a mentor and delivering notes and screenshots from the mentor to a parent or other user. FIG. 12 also illustrates handling of payments, booking sessions with predefined goals selected by a parent or other user, and the like.

Figure 13:
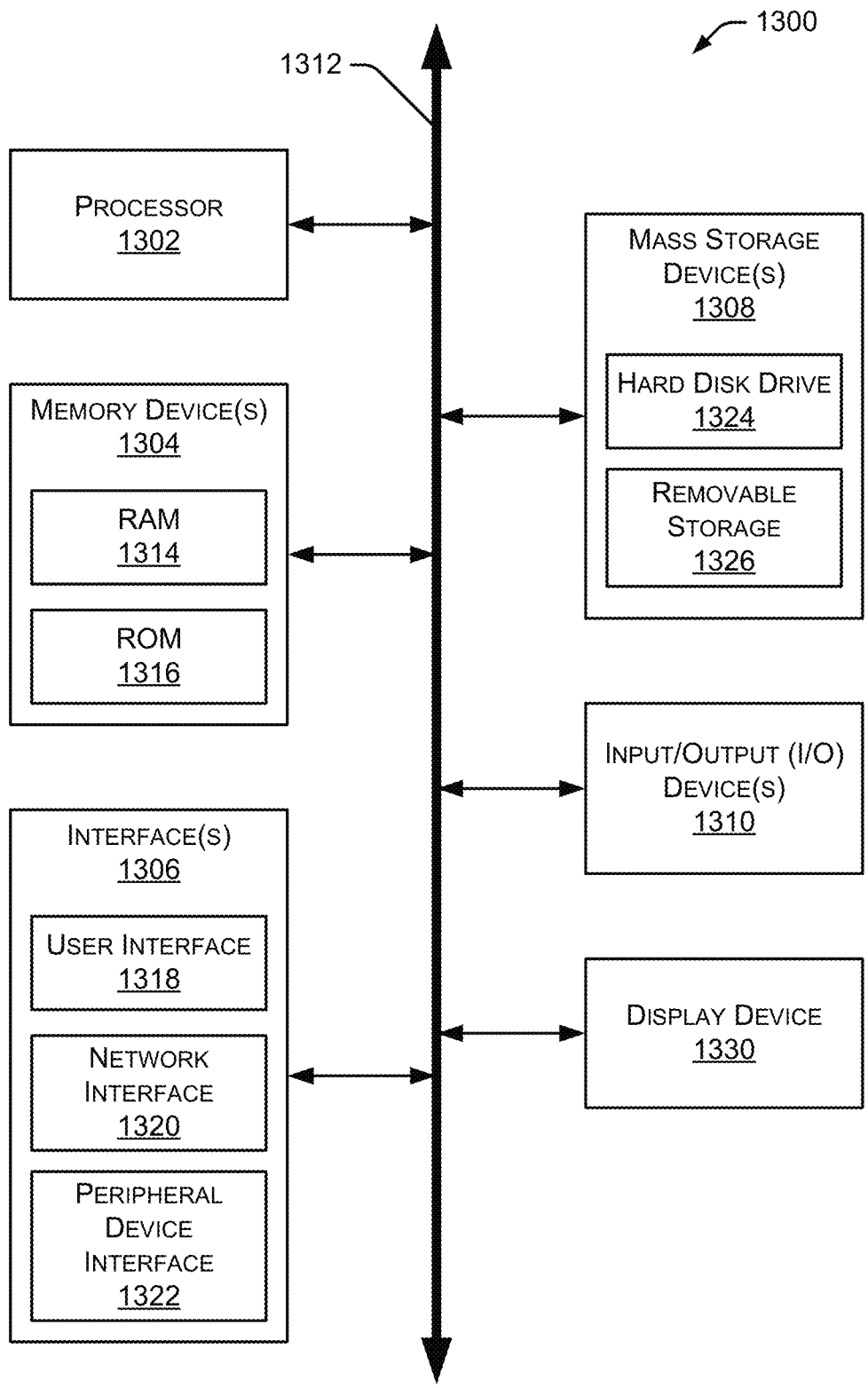
FIG. 13 illustrates an example block diagram of a computing device.

FIG. 13 illustrates an example block diagram of a computing device 1300 suitable for implementing the systems and methods described herein. In some embodiments, a cluster of computing devices interconnected by a network may be used to implement any one or more components of the systems discussed herein.

Computing device 1300 may be used to perform various procedures, such as those discussed herein. Computing device 1300 can function as a server, a client, or any other computing entity. Computing device can perform various functions as discussed herein, and can execute one or more application programs, such as the application programs described herein. Computing device 1300 can be any of a wide variety of computing devices, such as a desktop computer, a notebook computer, a server computer, a handheld computer, tablet computer and the like.

Computing device 1300 includes one or more processor(s) 1302, one or more memory device(s) 1304, one or more interface(s) 1306, one or more mass storage device(s) 1308, one or more Input/Output (I/O) device(s) 1310, and a display device 1330 all of which are coupled to a bus 1312. Processor(s) 1302 include one or more processors or controllers that execute instructions stored in memory device(s) 1304 and/or mass storage device(s) 1308. Processor(s) 1302 may also include various types of computer-readable media, such as cache memory.

Memory device(s) 1304 include various computer-readable media, such as volatile memory (e.g., random access memory (RAM) 1314) and/or nonvolatile memory (e.g., read-only memory (ROM) 1316). Memory device(s) 1304 may also include rewritable ROM, such as Flash memory.

Mass storage device(s) 1308 include various computer-readable media, such as magnetic tapes, magnetic disks, optical disks, solid-state memory (e.g., Flash memory), and so forth. As shown in FIG. 13, a particular mass storage device is a hard disk drive 1324. Various drives may also be included in mass storage device(s) 1308 to enable reading from and/or writing to the various computer-readable media. Mass storage device(s) 1308 include removable media 1326 and/or non-removable media.

I/O device(s) 1310 include various devices that allow data and/or other information to be input to or retrieved from computing device 1300. Example I/O device(s) 1310 include cursor control devices, keyboards, keypads, microphones, monitors or other display devices, speakers, printers, network interface cards, modems, lenses, CCDs or other image capture devices, remote game controllers, virtual reality (VR) headsets, VR glasses, any I/O device that inputs commands to control a game, and the like.

Display device 1330 includes any type of device capable of displaying information to one or more users of computing device 1300. Examples of display device 1330 include a monitor, display terminal, video projection device, and the like.

Interface(s) 1306 include various interfaces that allow computing device 1300 to interact with other systems, devices, or computing environments. Example interface(s) 1306 include any number of different network interfaces 1320, such as interfaces to local area networks (LANs), wide area networks (WANs), wireless networks, and the Internet. Other interface(s) include user interface 1318 and peripheral device interface 1322. The interface(s) 1306 may also include one or more user interface elements 1318. The interface(s) 1306 may also include one or more peripheral interfaces such as interfaces for printers, pointing devices (mice, track pad, etc.), keyboards, and the like.

Bus 1312 allows processor(s) 1302, memory device(s) 1304, interface(s) 1306, mass storage device(s) 1308, and I/O device(s) 1310 to communicate with one another, as well as other devices or components coupled to bus 1312. Bus 1312 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1300, and are executed by processor(s) 1302. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

While various embodiments of the present disclosure are described herein, it should be understood that they are presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the described exemplary embodiments, but should be defined only in accordance with the following claims and their equivalents. The description herein is presented for the purposes of illustration and description. It is not intended to be exhaustive or to limit the disclosure to the precise form disclosed. Many modifications and variations are possible in light of the disclosed teaching. Further, it should be noted that any or all of the alternate implementations discussed herein may be used in any combination desired to form additional hybrid implementations of the disclosure.

The invention claimed is:

1. A monitoring server system comprising:
one or more processors; and
one or more non-transitory computer-readable media storing instructions executable by the one or more processors, wherein the instructions, when executed, cause the monitoring server system to perform operations comprising:
  initiating an online gaming experience with a first user at a first electronic device;
  associating a second user with the online gaming experience at a second electronic device;
  receiving game audio data from a game server;
  receiving, independent of the game server, a voice overlay from the second user;
  playing, during the online gaming experience, the game audio data in a speaker proximate the first user;
  playing, during the online gaming experience, the voice overlay in the speaker;
  receiving a goal from the first user; and
  processing the voice overlay and the goal with an artificial intelligence component for (i) monitoring and analyzing communications by the first user and (ii) notifying the second user regarding safety of the online gaming experience,
  wherein the first user is (i) coupled to the game server and (ii) controls the online gaming experience, and
  wherein the monitoring server system is distinct from the game server.

2. The monitoring server system of claim 1, wherein the second user is at least one of a parent, a mentor, a coach, a monitor, or a supervisor.

3. The monitoring server system of claim 1, wherein the second user is not playing in the online gaming experience.

4. The monitoring server system of claim 1, wherein the first user is a child.

5. The monitoring server system of claim 1, wherein the voice overlay includes at least one of feedback from the second user, coaching from the second user, and instructions from the second user.

6. The monitoring server system of claim 1, the operations further comprising scheduling the online gaming experience prior to initiating the online gaming experience.

7. The monitoring server system of claim 1, the operations further comprising selecting the second user prior to initiating the online gaming experience.

8. The monitoring server system of claim 1, the operations further comprising monitoring activities in the online gaming experience.

9. The monitoring server system of claim 1, the operations further comprising capturing and saving activities and data associated with the online gaming experience.

10. The monitoring server system of claim 9, the operations further comprising generating a report summarizing the online gaming experience.

11. The monitoring server system of claim 9, the operations further comprising sending the activities and data associated with the online gaming experience to a parent of the first user.

12. The monitoring server system of claim 1, the operations further comprising inviting other users to receive the voice overlay and a streaming overlay associated with the online gaming experience.

13. The monitoring server system of claim 1, wherein playing the game audio data and the voice overlay in the speaker proximate the first user further includes:
  playing, during the online gaming experience, the game audio data in a first speaker of a headset used by the first user; and
  playing, during the online gaming experience, the voice overlay in a second speaker of the headset used by the first user.

14. The monitoring server system of claim 1, the operations further comprising matching the first user with the second user based on a profile of the first user and a profile of the second user.

15. The monitoring server system of claim 1, wherein at least one of (i) monitoring and analyzing communications by the first user and (ii) notifying the second user regarding safety of the online gaming experience, is performed after the online gaming experience.

16. A method comprising:
  initiating, by a monitoring device, an online gaming experience with a first user at a first electronic device;
  associating, by the monitoring device, a second user with the online gaming experience at a second electronic device;
  receiving, by the monitoring device, game audio data from a game server;
  receiving, by the monitoring device, independent of the game server, a voice overlay from the second user;
  playing, during the online gaming experience, the game audio data in a speaker proximate the first user;
  playing, during the online gaming experience, the voice overlay in the speaker;
  receiving a goal from the first user; and
  processing the voice overlay and the goal with an artificial intelligence component for (i) monitoring and analyzing communications by the first user and (ii) notifying the second user regarding safety of the online gaming experience,
    wherein the first user is (i) coupled to the game server and (ii) controls the online gaming experience,
    wherein the monitoring device is distinct from the game server.

17. The method of claim 16, wherein the second user is at least one of a parent, a mentor, a coach, a monitor, or a supervisor.

18. The method of claim 16, wherein the second user is not playing in the online gaming experience.

19. The method of claim 16, wherein the voice overlay includes at least one of feedback from the second user, coaching from the second user, and instructions from the second user.

20. The method of claim 16, further comprising scheduling the online gaming experience with the first user and the second user prior to initiating the online gaming experience.

21. The method of claim 16, further comprising capturing and saving activities and data associated with the online gaming experience.

* * * * *